3,122,589
PRODUCTION OF TRANS-QUINITOL
Reginald Francis Webb, Cambridge, and James Frederick Chandler, Whittlesford, England, assignors to Ciba Limited, Basel, Switzerland, a company of Switzerland
No Drawing. Filed Oct. 24, 1960, Ser. No. 64,295
Claims priority, application Great Britain Nov. 4, 1959
3 Claims. (Cl. 260—631)

This invention relates to a method for the production of trans-quinitol of the Formula I:

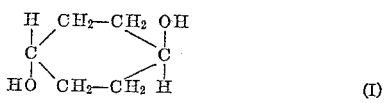
(I)

The importance of trans-quinitol in the production of film and fiber-forming polyesters has previously been demonstrated (see, e.g., U.S. Patent No. 2,621,167, granted April 8, 1948, to James Wotherspoon Fisher et al. (Celanese Corp. of America)), but the practical preparation of these polyesters has been limited by the inaccessibility of trans-quinitol. Previous routes to trans-quinitol have ben difficult and tedious, affording the material in low yield by the use of such processes as the fractional crystallization and subsequent saponification of the acetates of the mixture of cis- and trans-quinitols formed in the reduction of hydroquinone.

The present invention provides a new and simple method for the production of trans-quinitol and its esters with carboxylic acids. It has surprisingly been found that the conversion of 1:4-epoxy-cyclohexane of the Formula II:

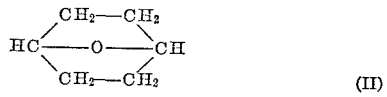
(II)

to trans-quinitol can be effected in excellent yield by treatment of the said epoxy compound with hot dilute sulfuric acid or other strong non-oxidizing oxygen-containing mineral acid, or by treatment with aqueous suspensions of cation-exchange resins such as sulfonated polystyrene. It has further been found that esters of trans-quinitol may be obtained directly from the aforesaid epoxy compound by treatment with organic acids such as formic, acetic, succinic and adipic acids. The ease of formation of trans-quinitol and its esters can be contrasted with the behaviour of related tetrahydrofurans which require most drastic conditions or reagents to effect scission of the oxide ring (see Owen, Annual Rep. Chem. Soc., London 1946, 42, 171).

According to a first feature of the present invention, therefore, there is provided a process for the production of trans-quinitol which comprises subjecting 1:4-epoxy-cyclohexane to treatment in aqueous medium with an oxygen-containing non-oxidizing acid having a dissociation constant $K_A$ of at least $10^{-5}$ and, where an ester of trans-quinitol is thus formed, hydrolysing the ester group thereof. Acids which fall within the foregoing definition are, for example, mineral acids such as dilute sulfuric acid or o-phosphoric acid; organic acids such as benzene-sulfonic acid, toluene-p-sulfonic acid, formic acid, acetic acid, chloroacetic acid, trichloro-acetic acid, cyanoacetic acid and lactic acid. Acidic cation-exchange resins such as sulfonated coal and sulfonated polystyrene may also be employed. These acids may be used in the form of their aqueous solutions or of aqueous suspensions, depending upon whether they are water-soluble or water-insoluble. The preferred conditions for the production of trans-quinitol are the use of sulfuric acid in a concentration of 5 to 20% by weight, at reaction temperatures between 70° and 140° C. Using sulfuric acid concentrations below 5% the hydrolysis is rather slow; by using high sulfuric acid concentrations or by working at elevated temperatures, cyclohexadienes and cyclohex-3-enol are increasingly formed.

Where the acid used is an anhydrous carboxylic acid the initial product of the reaction may be an ester of trans-quinitol of which the ester radical is derived from said acid. Subsequently hydrolysis of the ester to trans-quinitol can be effected by known methods, e.g. boiling with aqueous methanol.

According to a further feature of the present invention, therefore, there is provided a method for the production of esters of trans-quinitol which comprises treating 1:4-epoxy-cyclohexane with a substantially anhydrous carboxylic acid, such as formic, acetic, succinic or adipic acid. The preferred conditions for the production of the esters consist in treating 1:4-epoxy-cyclohexane with the substantially anhydrous carboxylic acid at temperatures between 80° and 200° C. The esters of trans-quintiol are thus formed directly.

The following examples, in which the parts are by weight, will serve to illustrate the invention.

Example 1

200 parts of 1:4-epoxy-cyclohexane, 200 parts of water and 40 parts of concentrated sulfuric acid were mixed and heated to reflux in an oil bath. After 7 hours the solution was cooled, diluted with 1000 parts of water and the solution thrice extracted with diethyl ether. The diethyl ether later yielded 40 parts of cyclohex-3-enol, B.P. 162–164° C. The aqueous layer of the hydrolysate was neutralized with baryta, the precipitated barium sulfate filtered off and the filtrate evaporated in vacuo, yielding 175 parts trans-quinitol, M.P. 144–145° C.

Example 2

100 parts of 1:4-epoxy-cyclohexane, 100 parts water and 10 parts of concentrated sulfuric acid were refluxed for 24 hours and the solution worked up as described in Example 1, 70 parts of trans-quinitol, M.P. 144–145° C., being obtained.

Example 3

100 parts of 1:4-epoxy-cyclohexane, 100 parts water and 100 parts of a sulfonated polystyrene cation-exchange resin in the acid form (sold under the trademark "Zeocarb 225") were heated to reflux with stirring for 24 hours and the mixture cooled and filtered. The filtrate was extracted with diethyl ether, and the aqueous phase on evaporation yielded 70 parts of trans-quinitol, M.P. 144–145° C.

Example 4

305 parts of 1:4-epoxy-cyclohexane and 950 parts of anhydrous formic acid were refluxed for 7 hours, the solution evaporated and the residue refluxed for 2 hours with 300 parts of water and 500 parts of methanol. The solution was then treated with decolorizing charcoal and filtered. The filtrate was evaporated to dryness and the residue on crystallization from methanol-diethyl either yielded 125 parts of trans-quinitol, M.P. 144–145° C.

Example 5

A solution of 305 parts of 1:4-epoxy-cyclohexane in 950 parts of anhydrous formic acid was refluxed for 7 hours and the solution then evaporated in vacuo. The residue, on crystallizaion from carbon tetrachloride, yielded 150 parts of the formate of trans-quinitol, M.P. 76° C., which could be hydrolysed to the trans diol, M.P. 144–145° C., by treatment with aqueous methanol as described in Example 4.

Example 6

100 parts of 1:4-epoxy-cyclohexane and 200 parts glacial acetic acid were heated in a sealed vessel at 170°

C. for 36 hours, the solution cooled and evaporated giving, in addition to unchanged epoxy-cyclohexane and acetic acid, a residue (45 parts) of the diacetate of trans-quinitol which on recrystallization from methanol had M.P. 102–104° C.

*Example 7*

196 parts of 1:4-epoxy-cyclohexane and 118 parts of succinic acid were maintained at 160° C. for 3 days in a stirred autoclave. The solution was cooled, unchanged succinic acid (70 parts) filtered off and the filtrate evaporated giving a solid (42 parts), M.P. 145–150° C., having an equivalent of 123 which was essentially the succinate of trans-quinitol.

What is claimed is:

1. A process for the production of trans-quinitol from 1,4-epoxycyclohexane which comprises treating 1,4-epoxy-cyclohexane in aqueous medium with an acid substance selected from the class consisting of sulfuric acid and sulfonic acid group containing cation-exchange resins.

2. A process according to claim 1, wherein 1,4-epoxy-cyclohexane is treated with sulfuric acid of concentration 5 to 20% by weight at temperatures between 70 and 140° C.

3. A process according to claim 1, wherein 1,4-epoxy-cyclohexane is treated with an aqueous suspension of sulfonated polystyrene.

References Cited in the file of this patent

UNITED STATES PATENTS

| | | |
|---|---|---|
| 1,817,425 | Steimmig et al. | Aug. 4, 1931 |
| 2,377,571 | Nudenberg | June 5, 1945 |

OTHER REFERENCES

Olberg et al.: Jour. Amer. Chem. Soc., volume 66, pages 1096–9 (1944).